Feb. 7, 1950 — E. GOESSEL — 2,496,789
MULTIPOLE ANODE CIRCUIT BREAKER AND OPERATOR THEREFOR
Filed Feb. 15, 1944 — 4 Sheets-Sheet 1

INVENTOR.
ELMER GOESSEL

INVENTOR.
ELMER GOESSEL

INVENTOR.
ELMER GOESSEL

Feb. 7, 1950     E. GOESSEL     2,496,789
MULTIPOLE ANODE CIRCUIT BREAKER
AND OPERATOR THEREFOR

Filed Feb. 15, 1944     4 Sheets-Sheet 4

INVENTOR.
ELMER GOESSEL
BY
Samuel Ostrolenk
Attorney

Patented Feb. 7, 1950

2,496,789

UNITED STATES PATENT OFFICE 2,496,789

MULTIPOLE ANODE CIRCUIT BREAKER AND OPERATOR THEREFOR

Elmer Goessel, Philadelphia, Pa., assignor to I-T-E Circuit Breaker Company, Philadelphia, Pa., a corporation of Pennsylvania Application February 15, 1944, Serial No. 522,444

7 Claims. (Cl. 200—92)

My present invention relates to anode circuit breakers, and more particularly to a mechanism for immediately reclosing the same upon the occurrence of an opening thereof.

Anode circuit breakers of this type are peculiarly adapted to the protection of mercury arc rectifier circuits. In the usual construction, the six anode circuits of the mercury arc rectifier are each protected by an individual anode circuit breaker.

In the event of a backfire or a short circuit current, in the reverse direction, arising from any other cause, the anode breaker in the particular circuit which is thus reversed, immediately opens. Heretofore in such anode circuit breaker systems, the other five circuit breakers were then immediately and automatically tripped in preparation for a reclosing operation. Even where the operation was automatic, it was believed that after one of the circuit breakers had tripped, it was necessary immediately to trip the others in order to effect the reclosing of all the circuit breakers simultaneously.

In actual practice, it has been found that the reverse current conditions which may occur in one of the poles of the rectifier is only momentary and upon a momentary termination of the circuit, electrical conditions will restore themselves to normal. Therefore, if only the affected circuit breaker is tripped at high speed, it may be reclosed without disturbing the remaining circuit breakers. In this manner, the fault may be rectified without any substantial interruption of the system.

In accordance with the present invention, means are provided for simultaneously closing all of the anode circuit breakers; this same means thereafter holds all of the anode breakers closed but permits any one of the breakers to trip open in response to predetermined conditions; and this same means may thereafter be operated to close the one breaker which has been tripped without opening or otherwise interfering with the other anode breakers operated thereby.

By this means, therefore, a backfire or other predetermined circuit condition resulting in the opening of one of the anode circuit breakers and the interruption of the flow of current in one of the anode circuits will nevertheless permit the remaining anode circuits to be operative, and these remaining circuits will not be interrupted during the reclosing of the circuit breaker which has tripped.

The present invention is primarily an improvement on the invention set forth in Patent No. 2,393,687 issued January 29, 1946 to Otto Jensen.

A primary object of my invention, therefore, is the provision of novel means for simultaneously closing and maintaining in closed position a group of anode circuit breakers in such manner that under predetermined current conditions one of these breakers may be tripped and thereafter reclosed by the same means without in any way disturbing the remaining circuit breakers.

Another and corollary object of my invention is the provision of novel means whereby a plurality of cams, each individually connected to an individual circuit breaker, may be simultaneously operated to close said circuit breakers; and whereby on the opening of one of said circuit breakers, the said reclosing means may be operated in the same manner to reclose the one circuit breaker which has opened without interfering with the other circuit breakers which have not opened.

Still another object of my invention is the provision of novel and improved means for opening and closing circuit interrupters.

These and many other objects of my invention will in part be apparent and where not apparent will be pointed out in the following description and drawings in which Figure 1 is a side view, partly in cross-section, of a circuit interrupter embodying the novel reclosing feature of my invention.

Figure 1:
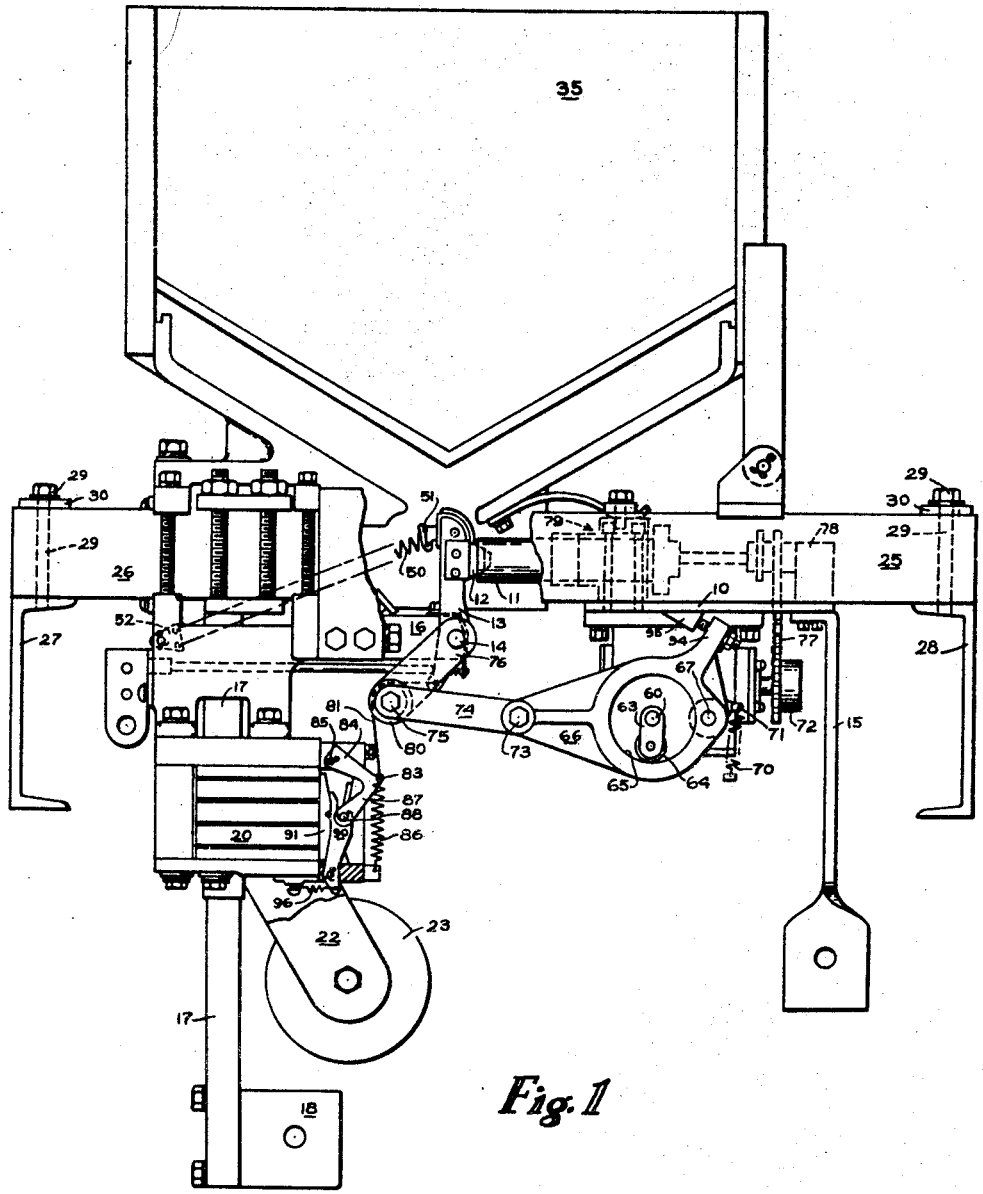

Referring now to Figure 1, the individual circuit breaker poles are of well known construction.

In each of the circuit breakers, current enters through the terminal bar 15, and flows through the connecting bar 18 to the main stationary contact 11, then to the main movable contact 12, which is mounted on the movable contact carrying arm 13.

The arm 13 is rotatably mounted on the pin 14, which in turn is mounted in appropriate bearings on the frame 16. Current flows through the pin 14 to the frame 16, and through the frame itself to the lower connecting bar 17 and to the connecting member 18.

The connecting bar 17 passes through the holding magnet 20 and constitutes a bucking bar therefor.

Magnet 20 is constructed and operates to permit a tripping of the circuit breaker on reverse current in the manner well known in the art, and is provided with pole pieces 22 and a shunt coil 23.

Figure 2:
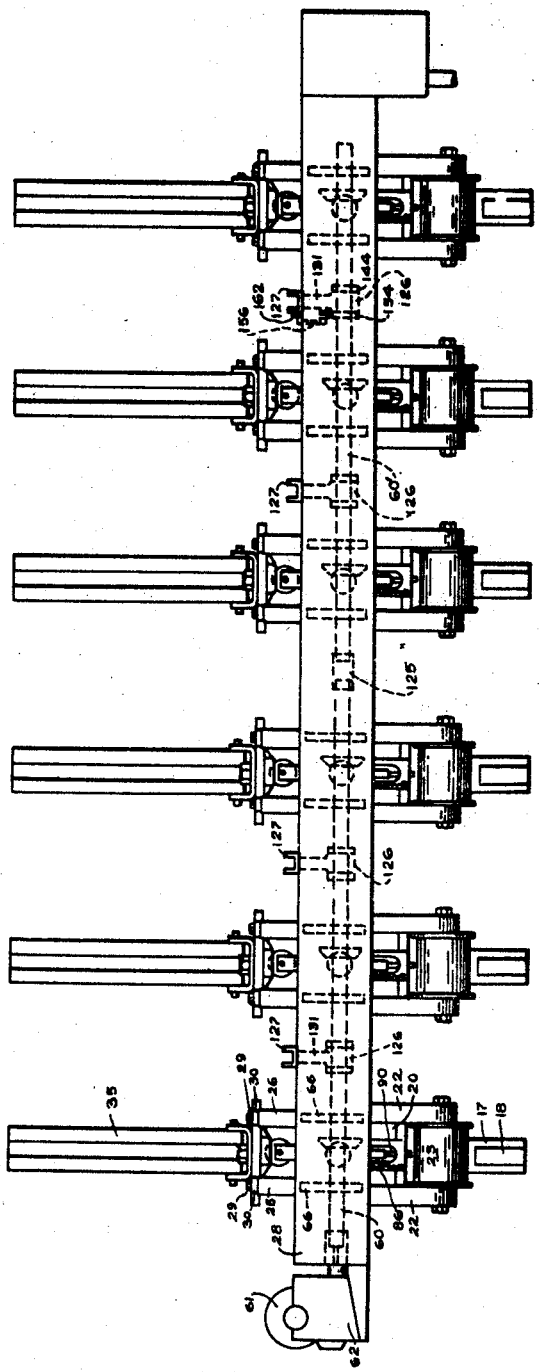
Figure 2 is a front view of a group of six anode circuit breakers designed to protect the six anode circuits of a single mercury arc rectifier and showing the mounting thereof for simultaneous operation in accordance with my invention.

As is shown in Figure 2, as well as in Figure 1, each circuit interrupter unit is mounted on a pair of insulating cross bars 25 and 26 which are mounted across a pair of channel members 27 and 28 in any suitable manner as, for instance, by the cap screws 29 passing through clamping members 30 into the channel members 27 and 28. This manner of mounting is well known in the art and requires no further elaboration here.

An appropriate arc chute 35, of any well known construction, may be mounted in any suitable manner with respect to the circuit interrupter.

The frame 16 itself may be supported from the insulated cross bars 25 and 26 also in the manner well known in the art.

The movable contact carrying arm 13 is provided with an opening tension spring 50 connected at one end to the lug 51 on the contact carrying arm 13 and connected at the opposite end to the lug 52 on the frame member 16.

Figure 3:
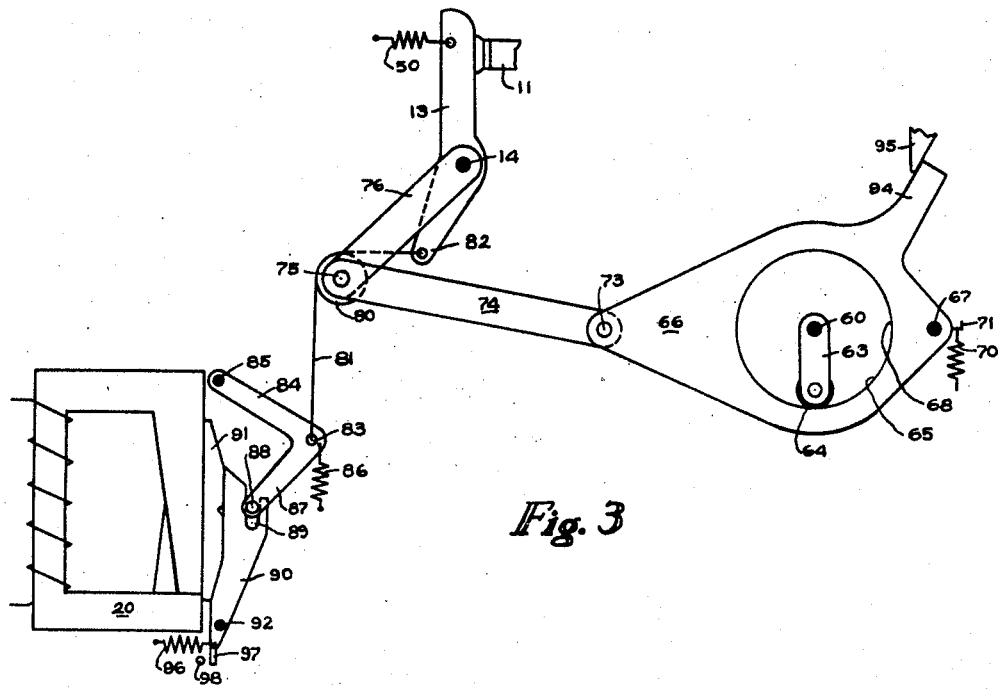
Figure 3 is a schematic view of the closing and reclosing feature of my invention showing the closed position thereof which corresponds to the position of the elements in Figure 1.

In Figure 3 I have shown in an enlarged schematic view the closing and tripping elements of the circuit interrupter of Figure 1.

The fixed shaft 60—60' is common to all of the circuit breakers and is actuated by the motor 61 through an appropriate gear connection encased in the housing 62 (Figure 2) and is provided with a crank 63 (referring once more to Figure 3) individual to each of the circuit interrupters.

The motor 61 (Figure 2) is preferably a compound motor and drives the cam shaft through a speed reducer and coupling 62. The cam shaft is sectionalized and comprises the two sections 60 and 60'.

The individual shaft sections 60 and 60' are supported upon the main circuit breaker frame in the bearings 126 which are carried upon the transverse channel sections 127 as is more clearly illustrated in Figure 2. Thus the channel 127 is welded or otherwise secured to the main structural channels 27 and 28. A block 131 secured to the channel 127 in a suitable manner carries the bearing 126.

Each of the cranks 63 is provided with a roller 64 which rides on the interior circular cammed surface 65 of the individual lever 66. Lever 66 is pivoted at the fixed pin 67.

A tension spring 70 is provided connected to a lug 71 at the right hand side of pivot 67, thus biasing the lever 66 toward rotation in a clockwise direction.

Lever 66 is connected at the pivot 73 to the link 74, which in turn is connected at its opposite end to the pivot pin 75.

Link 76 is also connected at one end to the pivot pin 75 and at the opposite end is connected to the fixed position pin 14 about which the movable contact carrying arm 13 rotates.

A roller 80 is also mounted on the pin 75.

A chain or cable 81 is connected to the lower end 82 of the movable contact carrying arm 13, passes over the roller 80, and then is connected at the pin 83 to the lever 84.

Lever 84 is rotatable about the fixed pivot pin 85 and is normally biased to clockwise rotation with respect to the pivot pin by means of the tension spring 86. Lever 84 has an extension 87 thereon at an angle thereto at the end of which is mounted a roller 88.

Roller 88, in the position shown in Figure 3, is seated in the slot 89 of the extension 90 of the armature 91.

Under ordinary conditions, the armature 91 is sealed against the holding magnet 20 in the manner well known in the art. It will thus be seen that the opening bias of the spring 50 tending to rotate the movable contact carrying arm 13 in a counterclockwise direction about the pin 14 is resisted by the cable 81 connected to the opposite end of the movable contact carrying arm 13 and held in taut condition by reason of the fact that the lever 84 to which the cable is connected is locked in the slot 89 of the extension 90 of the armature 91.

It will thus also be seen that the cable 81 is subjected to the full tension of the spring 50 as determined by the lengths of the respective lever arms between the points of connection of spring 50 and cable 81 to the arm 13 and the pivot pin 14 for the said arm.

Figure 4:
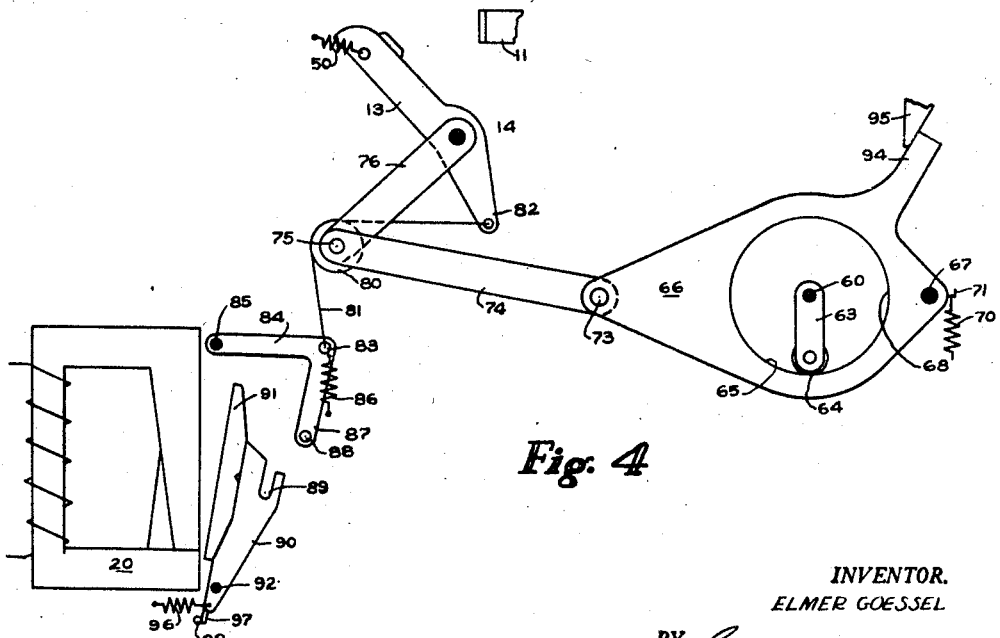
Figure 4 is a view corresponding to that of Figure 3 showing the tripped position of the elements of Figure 3.

Normally, the toggle arrangement between the links 66 and 74 is, as shown in Figures 3 and 4, below center. The spring 70 at this time is exerting a clockwise rotational force about a fixed pin 67 to carry the toggle over its center, but is insufficient to effect such operation against the action of springs 50 and member 84 locked by armature 91 which produce a downward and inward component force on roller 80. In the particular position of roller 64 shown in Figure 3, this roller also prevents any collapse of the toggle.

The position of lever 66 and the other elements of the circuit breaker are (in the position shown in Figure 3) thus determined by reason of the fact that extension 94 of the lever 66 bears against stop 95 to limit further counterclockwise rotation.

Therefore, when the elements of the closing mechanism of the circuit breaker are in the position shown in Figure 3, these elements will remain in that position irrespective of the angular position of the crank 63 and its roller 64 with respect to the cam surface 65 of the lever 66. This condition makes possible the reclosing of one of the circuit breakers without requiring the opening of the other anode breakers, as will hereinafter be pointed out.

At this time the motor driving the shaft 60 and through it the cam follower 64 may, if desired, be continuously operating, but is ineffective on the lever 66 inasmuch as the shaft 60 is in exact center with respect to the circumferential edge 65 over which the roller or cam follower 64 is moving.

Chain 81 is held in taut position, over roller 80 on the over center toggle, by member 87 locked in the slot of the armature member 89.

In response to a backfire in any one of the poles or in response to a short circuit causing a reverse current, the individual magnet 20, in the affected circuit, is de-energized sufficiently to permit armature 91 to rotate clockwise about its pin 92 under the action of a spring 96. The roller 88 rolls out of the slot 89 as shown in Figure 4, and the spring 50 thereupon becomes effective to instantly rock its arm 13 counterclockwise about pin 14 to open the circuit as shown in Figure 4. At the opening position, the force of the spring 50 has spent itself.

The motor is either started into operation in response to the movement of the arm 13 to its open position as is described in the earlier case, or may be of a continuously rotative type as already stated.

As the arm 63 rotates in a counterclockwise direction from the position shown in Figure 3 through 90°, the roller 64 will prevent any action of the spring 70 tending to effect clockwise rotation of the link 66. After the arm 63 has passed beyond 90° of rotation, it will reach a point, as for example 68, just above the pin 67 beyond which it no longer exerts any restraining action on the cam 66.

As roller 64 passes the point 68, the spring 70 becomes effective to rock the link 66 in a clockwise direction about pin 67 and the pin 73 is carried upwardly and past the over-center position, carrying with it the link 74. This occurs first by reason of the fact that the downward holding force on the lever 66 is removed by the upward rotation of the roller 64, and also by reason of the fact that the cable or chain 81 is no longer positively held in position by the armature.

The only force then holding the cable taut is the relatively light tension spring 86 connected to the lever 84. The force of this spring, especially by reason of the great mechanical disadvantage, is then insufficient to counteract the rotative force of the tension spring 70.

Figure 5:
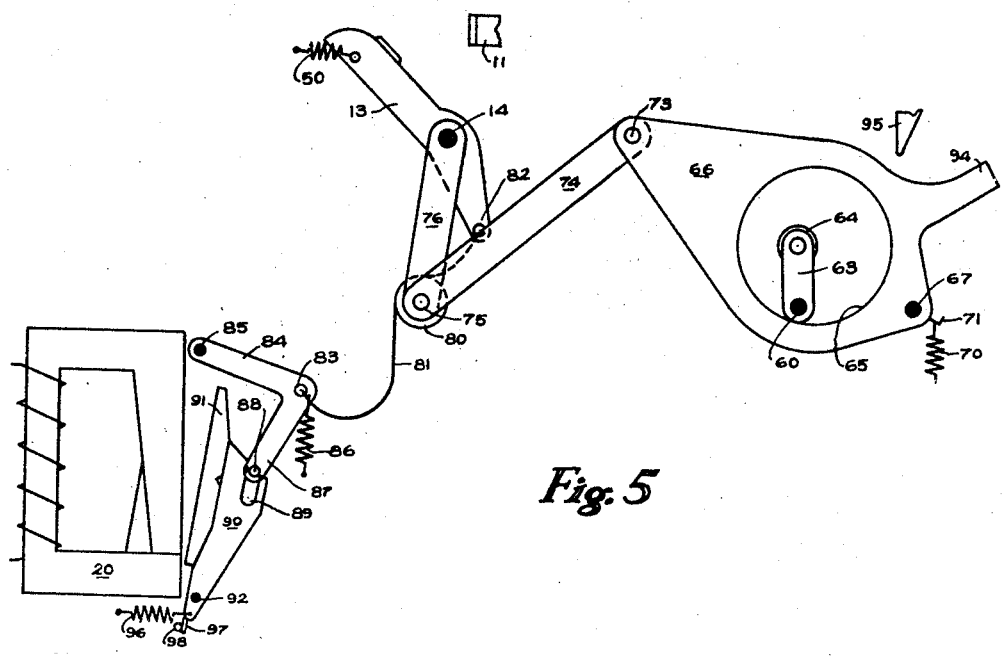
Figure 5 is a view corresponding to those of Figures 3 and 4 showing the position of the elements during the resetting operation.

During further rotation of the arm 63 through the next 90°, roller 64 is no longer in restraining contact with circumferential edge 65, and link 66 completes its rocking movement until it has reached the position shown in Figure 5.

At this position, the cable 81 is no longer taut as shown in Figure 5, and the relatively light spring 86 (since all counteracting forces have been removed) becomes effective to rotate the bell crank 84 about its pivot 85 until the roller 88 re-engages in the notch 89 of the armature extension 90.

The armature extension 90 is provided with a relatively light tension spring 96 biasing the armature toward counterclockwise direction from the position of Figure 3 to the position shown in Figure 4, and an appropriate stop 97 is provided on the armature extension 90 acting against a stationary member 98 to limit the outward rotation of the armature 91 and its extension 90.

The spring 96 is sufficiently light so as not to interfere with the holding force of the magnet when the circuit interrupter is closed; but when the circuit interrupter trips from the position shown in Figure 3 to the position shown in Figure 4, the spring 96 and the member 97 of the armature and the stop 98 against which it bears cooperate to ensure that the armature will remain in such a position that during the re-setting operation, the roller 88 on the extension 87 of the lever 84 will enter freely into the slot 89 of the extension 90 of the armature 91.

Figure 6:
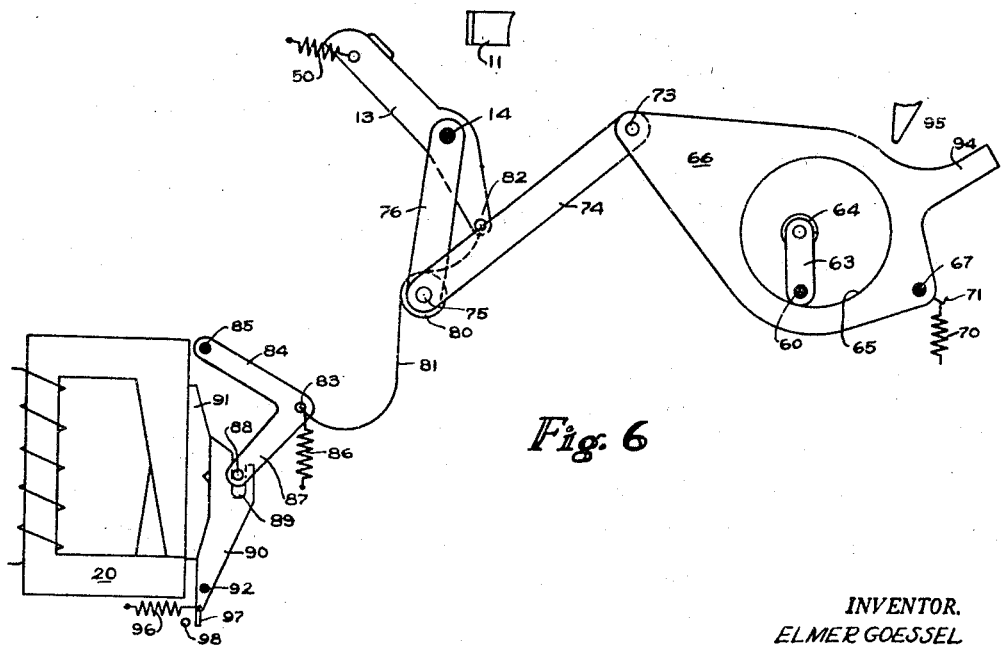
Figure 6 is a view corresponding to those of Figures 3, 4 and 5 showing the position of the elements when fully reset and ready to be reclosed; on further rotation of the cam member, the elements then move from the position of Figure 6 to the position of Figure 3.

This is the first or partial re-set. Magnet 20 upon opening of the circuit breaker is re-energized as described in the previous application and draws this armature 91 into energized position as shown in Figure 6, and the circuit breaker is in condition for re-setting.

On further rotation of the arm 63, roller 64 again engages the inner circumference or surface 65 and effects a rocking of the link 66 in a counterclockwise direction about its fixed pin 67. The pin 73 on its downward and counterclockwise rotation will in turn operate the pin 75 and its roller 80 outwardly, until the chain 81 again becomes taut.

Further rotation of the arm 63 through the remainder of the 360° continues this operation rotating the arm 66 in a counterclockwise direction until it carries the pin 73 and the link 74 over center back to the position shown in Figure 3, and in which the circuit breaker contact arm 13 is in closed position.

In order to permit links 74 and 66 to move over center, either the movable or fixed contacts have a resilient mounting.

Owing to the over-center position of the toggle 66—74, the system will be maintained in stable position by reason of the fact that extension 94 of lever 66 bears against the stop 95 at one end of the system, and by reason of the fact that the end of the cable or chain 81 is positively held stationary at the other end of the system by the sealing of the armature 91 against the magnet 20.

Lessening of the holding force of the magnet 20 to a point where it fails to counteract the open bias of the spring 50 will again result in a tripping of the circuit breaker.

During the complete revolution described above for the opening and closing of one circuit breaker, the cam links 66 of all the remaining circuit breakers are unaffected since the inner circumferential edges 65 of each of these circuit breakers remain in the position shown in Figure 3 so that their rollers 64, as arms 63 rotate, do not act on these members.

As above pointed out, the single shaft 60 extends through similar levers 66 in all of the circuit interrupters protecting the anode circuits of the single mercury arc rectifier.

Also, as above pointed out, once the circuit interrupter has been closed and the elements have assumed the position shown in Figure 3, the system no longer relies for support on the crank 63 and roller 64.

Accordingly, when the parts are in the position shown in Figure 3, the shaft 60 may be rotated to rotate the crank 63 and the roller 64 without resulting in any other motion of the remaining parts. This is so not only because the system is self-supporting, irrespective of the crank and roller, as above pointed out, but also, when the parts are in the position shown in Figure 3 in the closed position of the circuit interrupter, the shaft 60 is concentric with the circular cam surface 65 so that the roller 64, when the shaft is rotated, applies no rotative force to the lever 66.

Thus, where a plurality of circuit breakers is mounted to protect the anode circuits of a single mercury arc rectifier as shown in Figure 2, the tripping of one circuit breaker under predetermined conditions will not require the opening of the other circuit breakers preliminary to reclosing of the first circuit breaker.

When one of the circuit interrupters trips, its elements move from the position of Figure 3 to the position of Figure 4. The closing elements of the other circuit breakers remain in the position of Figure 3.

When all of the cranks are now rotated from the position of Figure 4 to the positions of Figures 5 and 6, then the one circuit breaker which has tripped will move from the position of Figure 4 to the positions of Figures 5 and 6; but the closing elements of the remaining circuit breakers will remain in the closed circuit position of Figure 3 irrespective of the angular position of the crank 63.

Then, as each of the cranks on the shaft 60 rotate from the position shown in Figure 6 to the position shown in Figure 3, the one circuit breaker which is tripped will be moved from the position shown in Figure 6 to the position shown in Figure 3; while the closing elements of all of the remaining circuit breakers will continue to remain in the position shown in Figure 3. By this means, therefore, the one circuit breaker which has tripped open may be immediately re-closed without requiring the remaining circuit breakers to be opened and while the remaining circuit breakers remain closed.

The operation of the various tripping and closing elements of the device have already been described.

In actual operation, it is necessary to start the motor 61 in order to go through the resetting and closing cycle.

An appropriate switch may be provided which may be actuated to start the motor for this purpose in order initially to close all of the circuit breakers. Similar switches may be arranged in parallel to be actuated by a portion of the operating mechanism of each circuit interrupter when it is tripped open in order to start the motor once more to close the circuit breaker, and an appropriate switch may be provided to disconnect the motor when the circuit breaker is closed in a manner well known in the art.

In accordance with my invention, it is possible, however, during the period in which the mercury arc rectifier is to remain in operation, that the motor 61 may be continuously operative to cause the shaft 60 to rotate continuously, and consequently to cause the crank 63 and its roller 64 to rotate continuously.

As has above been pointed out, once the circuit breakers are moved to the closed circuit position, they no longer rely on the shaft and crank to remain in that position. Consequently, the shaft and crank may continuously rotate without resulting in a tripping of any of the circuit breakers.

Once a circuit breaker has tripped, the rotation of the shaft and crank is necessary to reclose the circuit breaker. The continuous rotation of the shaft and all of the cranks individual to each circuit breaker while the circuit breakers are closed and while the mercury arc rectifier is in operation thus ensures that a circuit interrupter will be reclosed immediately following a tripping operation thereof.

The following examples are all dependent on the speed of rotation of the crank 63 with relation to the opening time of the circuit breaker. This tripping system is designed for maximum speed of operation. There are no latches the inertia or friction of which may delay the tripping operation. As described in well known constructions, the full opening operation, including a return to current zero and the extinguishing of the arc takes .64 cycle. It has been found that .17 cycle elapses after the initiation of the back-fire before the parts begin to open. Consequently, the time from actual beginning of the opening operation to current zero is .47 cycle.

1. Assuming a preferred speed for the crank of 60 R. P. M. or one revolution in 60 cycles:

a. When the trip is completed (Figure 4 shows condition of all parts, except the crank, whenever a trip occurs) while the crank is in the position shown in Figures 3 and 4, then it will take a 360° rotation of the crank or one second to reclose, going from Figure 4 to Figure 5 to Figure 6 to the closed position of Figure 3.

b. When the trip is completed while the crank is in the position of Figures 5 and 6 (the crank rotates counterclockwise in all examples), then the parts will have time, before the crank advances 90° further, to go through the resetting operations shown in Figures 5 and 6. Consequently, the parts will be re-set before the crank reaches a horizontal position to the left (between the positions of Figures 6 and 3) at which position reclosing begins. The reclosing will then take place within 180° or one-half second.

c. When the trip is completed while the crank (moving counterclockwise) is in a position between that of Figure 6 and Figure 3, but substantially more than 90° away from the Figure 3 position, then (i) assuming that the parts re-set within one cycle after completion of the trip, the crank must be more than 96° away from the Figure 3 position to reclose within less than a revolution, and (ii) if the parts re-set within 3 cycles, the crank must be more than 108° away from the Figure 3 position to reclose within less than a revolution. The re-closing in such cases would be within less than one-half second. (iii) But if the crank is closer than 90° plus the angular distance it traverses during re-setting of the parts, reclosing will take more than 430°.

2. Assuming the opposite condition of an unnecessarily high speed for the crank of 3600 R. P. M., then the foregoing conditions apply with the one important exception that opening time of .47 cycle is now equal to almost 180° rotation of the crank and a re-setting time of as little as even one-half cycle adds another 180° rotation of the crank. Consequently, the foregoing examples apply to this speed only after the rotation of the crank during opening and re-setting is accounted for; and reclosure will then take place within more than 90° and less than 430° after the circuit breaker has been tripped and re-set. The full closing time after current zero is reached with the contacts fully opened may thus be 610°+ or 1.75+ cycles and may be as little as 90°+ or .5+ cycle. The full closing time from the initiation of the contact opening to closing may be 720° or 2 cycles but not less than 430° or 1.25 cycles.

3. For crank speeds between the preferred 60 R. P. M. and the unnecessarily high 3600 R. P. M., similar calculations may be made.

With the relatively slow speed of 60 R. P. M., reclosing takes place in less than two seconds.

In the foregoing, I have described my invention primarily from the point of view of its applicability to anode circuit breakers; and this, indeed, has been the primary purpose for which the invention has been developed.

It is obvious, however, that the operating mechanism for the circuit breaker herein described may be utilized on circuit interrupters adaptable to many other purposes, and that the various operating elements may be given different forms and structural arrangements, and that thus many variations and modifications in the function and use thereof will be obvious to those skilled in the art. Accordingly, I prefer to be bound not by the specific disclosures herein contained, but only by the appended claims.

I claim:

1. In a circuit breaker having a movable contact and a complementary contact, an operating mechanism including a lever, said operating mechanism being connected to said movable contact, said lever having a circular opening therethrough, a shaft extending through said opening, a crank and roller on said shaft; said opening having a radius equal to the radius of said crank and roller; said lever being pivotally mounted and biased for movement in a direction to bring a portion of the inner surface of said opening adjacent the shaft; rotation of said shaft rotating said crank and roller against the inner surface of said opening to move said lever against said bias to move said movable contact toward said complementary contact, and releasable means for locking said lever in position when the opening in said lever is concentric with said shaft; said shaft, crank and roller being thereafter rotatable in said opening while leaving said lever unaffected.

2. In a multiphase circuit breaker having a plurality of poles, each pole having a movable contact and a complementary contact operating mechanism comprising a lever, said operating mechanism being connected to said movable contact, said lever having a circular opening therethrough, a shaft common to said poles extending through the openings of said lever, a crank and roller for each pole on said shaft, each crank and roller registering with a circular opening of each lever; each opening having a radius equal to the radius of the crank and roller registering therewith; each lever being pivotally mounted and biased for movement in a direction to bring a portion of the inner surface of its opening adjacent the shaft; rotation of said shaft rotating said cranks and rollers against the inner surfaces of the respective openings to move each lever against said bias to move said movable contact against said complementary contact, and means individual to each pole for releasably locking each lever in position when the opening in said lever is concentric with said shaft; said shaft and each crank and roller being thereafter rotatable in the respective openings while leaving said lever unaffected.

3. In a multiphase circuit breaker having a plurality of poles, each pole having a movable contact and a complementary contact operating mechanism comprising a lever, said operating mechanism being connected to said movable contact, said lever having a circular opening therethrough, a shaft common to said poles extending through the openings of said lever, a crank and roller for each pole on said shaft, each crank and roller registering with a circular opening of each lever; each opening having a radius equal to the radius of the crank and roller registering therewith; each lever being pivotally mounted and biased for movement in a direction to bring a portion of the inner surface of its opening adjacent the shaft; rotation of said shaft rotating said cranks and rollers against the inner surfaces of the respective openings to move each lever against said bias to move said movable contact against said complementary contact, and means individual to each pole for releasably locking each lever in position when the opening in said lever is concentric with said shaft; said shaft and each crank and roller being thereafter rotatable in the respective openings while leaving said lever unaffected; said shaft and each crank and roller being also rotatable to operate any lever to the concentric position while leaving the remaining levers in the concentric position unaffected.

4. In a multiphase circuit breaker having a plurality of poles, each pole having a movable contact and a complementary contact operating mechanism comprising a lever, said operating mechanism being connected to said movable contact, said lever having a circular opening therethrough, a shaft common to said poles extending through the openings of said lever, a crank and roller for each pole on said shaft, each crank and roller registering with a circular opening of each lever; each opening having a radius equal to the radius of the crank and roller registering therewith; each lever being pivotally mounted and biased for movement in a direction to bring a portion of the inner surface of its opening adjacent the shaft; rotation of said shaft rotating said cranks and rollers against the inner surfaces of the respective openings to move each lever against said bias to move said movable contact against said complementary contact, and means individual to each pole for releasably locking each lever in position when the opening in said lever is concentric with said shaft; said shaft and each crank and roller being thereafter rotatable in the respective openings while leaving said lever unaffected; said shaft and each crank and roller being continuously rotatable to operate any lever which has moved away from the concentric position back to the concentric position while leaving the remaining levers in the concentric position unaffected.

5. In a system having a plurality of circuit breakers; each of said circuit breakers having a movable contact arm, a holding magnet for each circuit breaker for holding its individual movable contact arm in circuit closing position; a collapsible toggle mechanism for each circuit breaker connected to the movable contact arm of said circuit breaker; one of the elements of the toggle including a cam; operating means individual to each cam, a common drive for the operating means of each cam; said common drive operating the individual cam and toggle of each circuit breaker to operate said movable contact arms to circuit closing positions, said operating means thereafter being ineffective on further actuation thereof by said drive for operating on said cam mechanism.

6. In a system having a plurality of circuit breakers, each of said circuit breakers having a movable contact arm, a holding magnet for each circuit breaker for holding its individual movable contact arm in circuit closing position, a collapsible toggle mechanism for each circuit breaker connected to the movable contact arm of said circuit breaker; one of the elements of the toggle including a cam; operating means individual to each cam, a common drive for the operating means of each cam, and means including said toggle and cam mechanism and said operating means whereby any one of said circuit breakers may be opened and closed without affecting the operation of the remaining circuit breakers.

7. In a circuit breaker for protecting an electric circuit, a pair of cooperable contacts, one of said contacts being movable with respect to the other of said contacts for effecting engagement and disengagement therewith and being biased to disengaged position, a holding magnet having an armature, said magnet being responsive to circuit conditions in the circuit being protected, a flexible connection from said armature to said movable contact, a collapsible toggle including a cam mechanism connected to said connection between said movable contact and said armature, means for collapsing said toggle when said movable contact is moved to its disengaged position, a source of power for operating said cam mechanism, said source of power being ineffective on said cam mechanism while said movable contact is in engaged position and said cam mechanism being moved to be operated by said source of power when said movable contact is moved to disengaged position.

ELMER GOESSEL.

REFERENCES CITED

The following references are of record in the file of this patent:

UNITED STATES PATENTS

| Number | Name | Date |
|---|---|---|
| Re. 18,238 | Whittingham | Oct. 27, 1931 |
| 1,272,445 | Holliday | July 16, 1918 |
| 1,611,779 | Read | Dec. 21, 1926 |
| 1,654,102 | Thompson | Dec. 27, 1927 |
| 1,670,088 | Walle | May 15, 1928 |
| 1,696,582 | Rankin | Dec. 25, 1928 |
| 1,816,789 | Pailin | July 28, 1931 |
| 1,969,576 | Paxton | Aug. 7, 1934 |
| 2,034,146 | Linde | Mar. 17, 1936 |
| 2,112,054 | Thumim | Mar. 22, 1938 |